US012679714B2

(12) United States Patent
Munoz et al.

(10) Patent No.: US 12,679,714 B2
(45) Date of Patent: Jul. 14, 2026

(54) DIFFUSER NOZZLE FOR IMPROVED CARBONATION DISPENSING

(71) Applicant: THE COCA-COLA COMPANY, Atlanta, GA (US)

(72) Inventors: Brad Munoz, Atlanta, GA (US); Austin Forgey, Atlanta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 380 days.

(21) Appl. No.: 18/580,067

(22) PCT Filed: Aug. 5, 2022

(86) PCT No.: PCT/US2022/039541
§ 371 (c)(1),
(2) Date: Jan. 17, 2024

(87) PCT Pub. No.: WO2023/014954
PCT Pub. Date: Feb. 9, 2023

(65) Prior Publication Data

US 2024/0308836 A1 Sep. 19, 2024

Related U.S. Application Data

(60) Provisional application No. 63/230,462, filed on Aug. 6, 2021.

(51) Int. Cl.
*B67D 1/00* (2006.01)

(52) U.S. Cl.
CPC ........... *B67D 1/007* (2013.01); *B67D 1/0021* (2013.01); *B67D 1/0072* (2013.01)

(58) Field of Classification Search
CPC .... B67D 1/007; B67D 1/0021; B67D 1/0072; B67D 1/1272
(Continued)

(56) References Cited

U.S. PATENT DOCUMENTS 7,383,966 B2 * 6/2008 Ziesel .................. B67D 1/0051 222/1
7,578,415 B2 * 8/2009 Ziesel .................. B67D 1/0085 222/129.1
(Continued)

FOREIGN PATENT DOCUMENTS

EP 3160895 B1 4/2021

OTHER PUBLICATIONS

International Search Report and Written Opinion issued in PCT/US2022/039541 mailed Dec. 6, 2022.

*Primary Examiner* — Charles S Bushey
(74) *Attorney, Agent, or Firm* — Meunier Carlin & Curfman LLC

(57) ABSTRACT

Systems, devices, and methods for fluid dispensing nozzles are described. Various implementations include a fluid dispensing nozzle including an inlet section which defines an inlet channel with a first diameter, and a restriction region which defines a restriction channel fluidically coupled to the inlet channel. The restriction channel extends along a first predetermined length and has a second diameter that is smaller than the first diameter. The nozzle includes an expansion chamber which defines an expansion channel fluidically coupled to the restriction channel. The expansion chamber has a trumpet shape with a maximum diameter at an outlet of the expansion chamber. The maximum diameter of the expansion chamber is greater than the first diameter; and nozzle includes a diffuser plate positioned at the outlet of the expansion chamber. The diffuser plate includes a plurality of openings and a mesh insert that is disposed across the plurality of openings.

20 Claims, 2 Drawing Sheets

(58) Field of Classification Search
USPC .................................................... 261/DIG. 7
See application file for complete search history.

(56) References Cited

U.S. PATENT DOCUMENTS

| | | | | |
|---|---|---|---|---|
| 9,668,609 | B2 * | 6/2017 | Herbert | A47J 31/4403 |
| 9,669,609 | B2 | 6/2017 | Donohue | |
| 11,173,422 | B2 * | 11/2021 | Chang | A23L 2/76 |
| 11,325,818 | B2 * | 5/2022 | Dahlberg | B67D 1/0021 |
| 2017/0190554 | A1 | 7/2017 | Dahlberg et al. | |
| 2017/0197815 | A1 | 7/2017 | Erigican et al. | |
| 2019/0330044 | A1 * | 10/2019 | Conover | B67D 1/0052 |
| 2020/0023292 | A1 | 1/2020 | Chang et al. | |

* cited by examiner

DIFFUSER NOZZLE FOR IMPROVED CARBONATION DISPENSING

FIELD OF THE INVENTION

The present application and the resultant patent relate generally to dispensing nozzle assemblies and more particularly relate to beverage dispensing nozzle assemblies configured to minimize carbonation breakout.

BACKGROUND

Current post-mix beverage dispensing nozzles generally mix streams of syrup, concentrate, sweetener, bonus flavors, other types of flavoring, and other ingredients with water or other types of diluent by flowing the syrup stream down the center of the nozzle with the water stream flowing around the outside. The syrup stream is directed downward with the water stream such that the streams mix as they fall into a consumer's cup.

There is a desire for a beverage dispensing system as a whole to provide as many different types and flavors of beverages as may be possible in a footprint that may be as small as possible. Preferably, such a beverage dispensing system may provide as many beverages as may be available on the market in prepackaged bottles, cans, or other types of containers.

In order to accommodate this variety, the dispensing nozzles need to accommodate fluids with different viscosities, flow rates, mixing ratios, temperatures, and other variables. Current dispensing nozzle assemblies may not be able to accommodate multiple beverages with a single nozzle design and/or the dispensing nozzle assembly may be designed for specific types of fluid flow. One known means of accommodating differing flow characteristics is shown in commonly owned U.S. Pat. No. 7,383,966 that describes the use of replaceable fluid modules that are sized and shaped for specific flow characteristics. U.S. Pat. No. 7,383,966 is incorporated herein by reference in full. Even more variety and more fluid streams may be employed in commonly owned U.S. Pat. No. 7,578,415 that shows the use of a number of tertiary flow assemblies. U.S. Pat. No. 7,578,415 also is incorporated herein by reference in full.

Some current nozzles can be used to dispense carbonated beverages. Some of the current nozzles can be used to mix various flavors into carbonated water to provide multiple carbonated beverage flavors from a single system. Some systems dissolve carbon dioxide in water to form carbonated water, flavor the carbonated water, and dispense the flavored carbonated water from the nozzle, which results in various levels of carbonation and carbonation breakout in the dispensed beverages.

SUMMARY

Various implementations include a fluid dispensing nozzle that includes an inlet section which defines an inlet channel with a first diameter, and a restriction region which defines a restriction channel fluidically coupled to the inlet channel. The restriction channel extends along a first predetermined length and has a second diameter that is smaller than the first diameter. The nozzle includes an expansion chamber which defines an expansion channel fluidically coupled to the restriction channel. The expansion chamber has a trumpet shape with a maximum diameter at an outlet of the expansion chamber. The maximum diameter of the expansion chamber is greater than the first diameter; and nozzle includes a diffuser plate positioned at the outlet of the expansion chamber. The diffuser plate includes a plurality of openings and a mesh insert that is disposed across the plurality of openings.

In some implementations, the trumpet shape of the expansion chamber includes a curved expansion section including a flared body that extends from the second diameter of the restriction channel and increases in diameter toward the expansion chamber outlet.

In some implementations, the flared tube as viewed through an axial cross section of the expansion chamber forms an exponential curve on each side of and spaced apart from a central longitudinal axis of the expansion chamber.

In some implementations, the trumpet shape of the expansion chamber further includes a linear expansion section extending between a maximum diameter of the curved expansion section and the maximum diameter at the outlet of the expansion chamber.

In some implementations, the outlet diameter of the expansion chamber is from 10 to 20 times the inlet diameter of the expansion chamber.

In some implementations, the expansion chamber has an axial length from 0.10 to 0.20 times the outlet diameter of the expansion chamber.

In some implementations, the mesh insert has from 100 to 500,000 mesh openings per square foot.

In some implementations, the mesh insert includes a plurality of mesh intersections. At least one of the mesh intersections is positioned across a cross section of each of the plurality of openings of the diffuser plate.

In some implementations, the inlet diameter of the restriction region is from 10 to 20 times smaller than the first diameter of the inlet section.

In some implementations, the restriction region has an axial length greater than the inlet diameter of the restriction region.

In some implementations, a straight tube outlet that defines a straight tube channel.

In some implementations, the straight tube outlet has a length from 0.25 inches to 1.5 inches.

In some implementations, the straight tube channel has a uniform diameter that is equal to a maximum diameter of the expansion body.

In some implementations, the tube outlet has an axial length from 0.50 to 3.0 times the diameter of the straight tube channel.

Various implementations include, a beverage dispensing system. The system includes a nozzle, a carbonator with a water inlet, a carbon dioxide inlet, and a carbonated water outlet; and a carbonated water line extending between the carbonated water outlet and the nozzle. The nozzle includes an inlet section which defines an inlet channel with a first diameter and a restriction region which defines a restriction channel fluidically coupled to the inlet channel. The restriction channel extends along a first predetermined length and having a second diameter that is smaller than the first diameter. The nozzle includes an expansion chamber which defines an expansion channel fluidically coupled to the restriction channel. The expansion chamber has a trumpet shape with a maximum diameter at an outlet of the expansion chamber. The maximum diameter of the expansion chamber is greater than the first diameter. The nozzle includes a diffuser plate positioned at the outlet of the expansion chamber. The diffuser plate includes a plurality of openings and a mesh insert that is disposed across the plurality of openings.

16. In some implementations, the carbonator water outlet is fluidically coupled to the restriction channel to provide carbonated water through the compression channel.

In some implementations, the restriction channel is configured to provide a backpressure from the nozzle to the carbonator.

In some implementations, the carbonator is configured to supply carbonated water to the carbonated water outlet at a first pressure and exit the system at a second pressure. The expansion chamber is configured to mitigate turbulence of carbonated water exiting the system.

In some implementations, the expansion chamber is configured to promote a uniform fluid velocity across a cross section of the expansion channel.

In some implementations, the nozzle includes a straight tube outlet that defines a straight tube channel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

In the following description, specific details are set forth describing some implementations consistent with the present disclosure. Numerous specific details are set forth in order to provide a thorough understanding of the implementations. It will be apparent, however, to one skilled in the art that some implementations may be practiced without some or all of these specific details. The specific implementations disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one implementation may be incorporated into other implementations unless specifically described otherwise or if the one or more features would make an implementation non-functional. In some instances, well known methods, procedures, and components have not been described in detail so as not to unnecessarily obscure aspects of the implementations.

In a traditional nozzle for carbonated fluid, the carbonated fluid passes through the nozzle and flows through the outlet. Carbon dioxide bubbles in the carbonated fluid breakout erratically, which can provide undesirable outlet fluid characteristics such as increased foaming and/or lower levels of dissolved carbon dioxide. Various implementations described herein provide a nozzle that has an inlet, a restriction region, an expansion chamber and a mesh insert that separately and in combination limit carbonation breakout in a dispensed fluid. The restriction region provides backpressure from the carbon dioxide inlet to discourage carbonation breakout upstream of the nozzle. The mesh insert distributes the bubbles that do form evenly across the cross section of the outlet.

Figure 1:
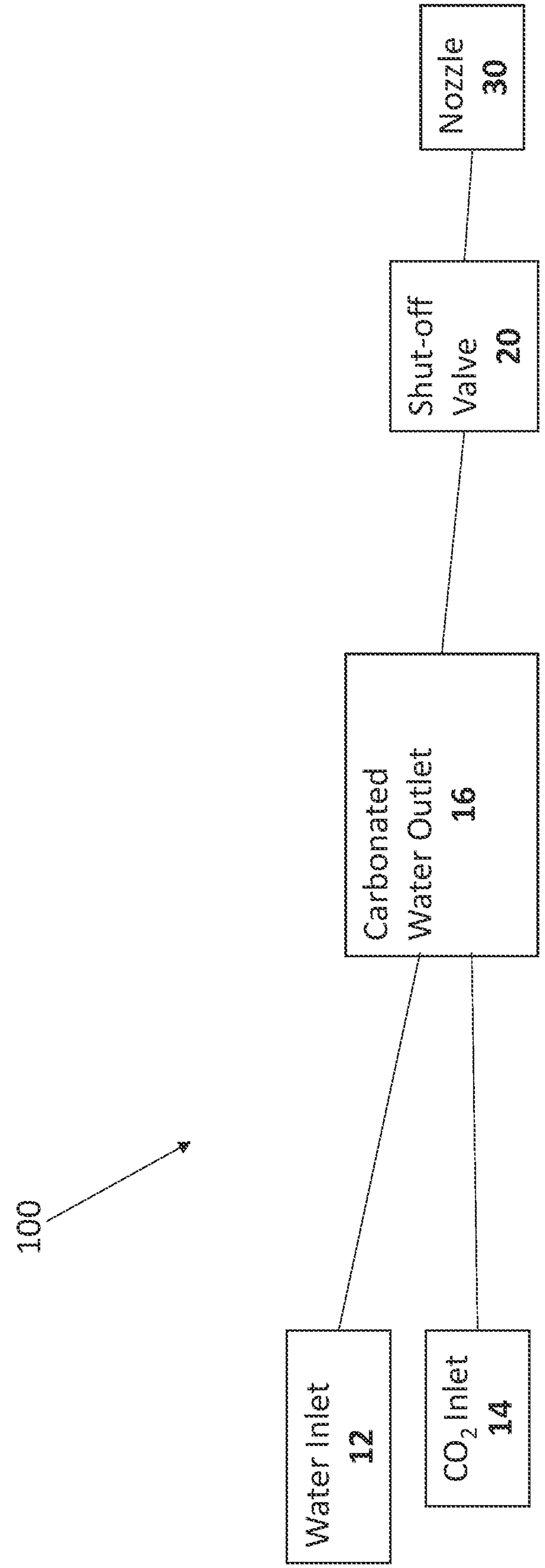
FIG. 1 is a fluid circuit of a carbonated fluid dispenser that includes a dispensing nozzle.

FIG. 1 shows a carbonated water circuit 100 in a carbonated fluid dispensing system. The carbonated water circuit 100 comprises a carbonator, a carbonated water line, a shut-off valve 20, and a dispensing nozzle 30. The system is provided to dispense carbonated fluid with minimal carbonation breakout. The carbonated water circuit 100 is couplable to other systems in a beverage dispenser. Only the carbonated water circuit 100 is shown, but other fluid circuits may be present in beverage dispensing systems. For example, some beverage dispensing systems include one or more beverage concentrates, sweeteners, micro-ingredients, and/or flavors to be dispensed with or otherwise mixed with the carbonated water to form a completed beverage. Additional components may be included in the carbonated water circuit 100, such as a heat exchanger for cooling water supplied to the carbonator. Moreover, while the disclosure is focused on examples of a carbonated water circuit, the nozzle described herein may be used for dispensing any multi-phase fluid in a fluid dispensing system.

The carbonator includes a water inlet 12, a carbon dioxide inlet 14, a carbonated water outlet 16. The water inlet 12 and the carbon dioxide inlet 14 supply water and carbon dioxide to the carbonator under conditions that the carbon dioxide is dissolved into the water to form carbonated water. For example, in various beverage dispenser applications, the carbonator may dissolve 4 or more volumes of carbon dioxide into the water. The carbonated water outlet 16 supplies the carbonated water from the carbonator.

The carbonated water line extends between and is fluidically coupled to the carbonated water outlet 16 and the nozzle 30. The carbonated water line supplies carbonated water from the carbonator to the nozzle 30. The carbonated water line 18 is an air-tight tube that is sealed to allow carbonated water to pass therethrough with minimal loss in carbonation.

The shut-off valve 20 is disposed in the carbonated water line between the carbonator and the nozzle 30. The shut off valve 20 can be selectively opened or closed to respectively allow or prevent a flow of carbonated water from being dispensed through the nozzle 30. Other flow control arrangements are contemplated by this disclosure. Although the shutoff valve 20 is disposed in the carbonated water line, in some implementations the shutoff valve 20 is disposed at either end of the carbonated water line or at any other point between the carbonator and the nozzle 30, suitable to control the flow or carbonated water from the carbonator to the nozzle.

Figure 2:
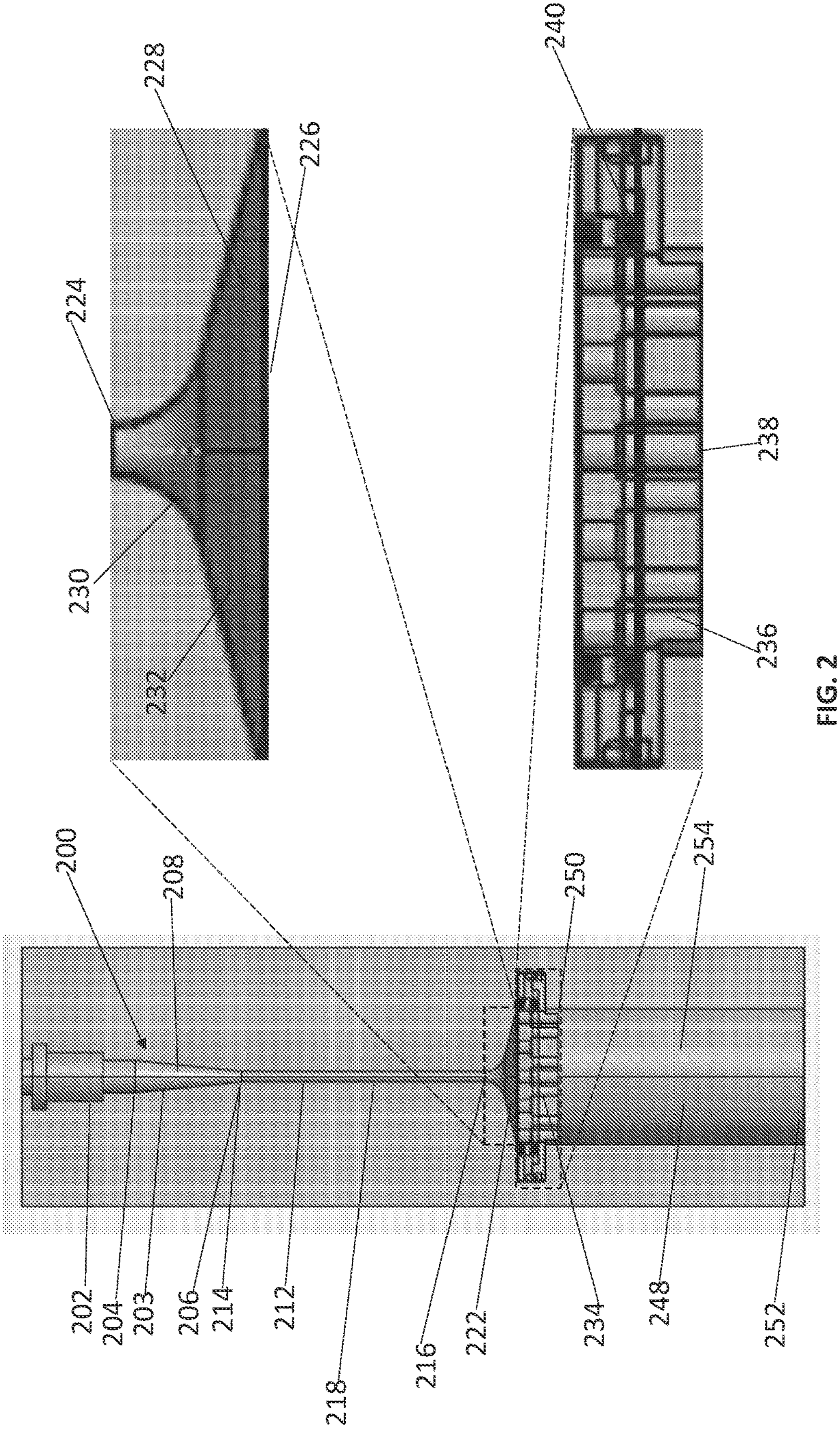
FIG. 2 is a side partial cutaway view of the nozzle with detailed views of an expansion chamber and a diffuser plate.

FIGS. 2-3 show a dispensing nozzle 200 according to one implementation. The nozzle 200 may be used in the carbonated water circuit 100 described above. For example, the nozzle 30 of FIG. 1 may be implemented with the nozzle 200. The nozzle 200 minimizes breakout of bubbles in carbonated water flowing through the system to maintain a carbonation level of a dispensed fluid at a higher level than with other dispensing nozzles.

The nozzle 200 includes an inlet section 202, a restriction region 212, an expansion chamber 222, a diffuser plate 234 with a mesh insert 240, and a straight tube outlet 248. As will be described in detail below, the restriction region 212 provides an upstream backpressure to reduce the amount of carbonation breakout prior to reaching the nozzle and the mesh insert 240 acts to evenly distribute the carbonation bubbles that do form.

Together, these features of the nozzle 200 enable a user to dispense carbonated water with higher carbonation levels than traditional dispensing nozzles. For example, legacy beverage dispenser nozzles typically can dispense beverages with 3.8 vol./vol. of carbon dioxide, whereas the nozzle 200 is able to dispense beverages with 4.0 vol./vol. of carbon dioxide or more. In comparison a can of a carbonated beverage is typically also provided with 4.0 vol./vol. of carbon dioxide. Therefore, the nozzle 200 is able to dispense beverages with a quality similar to that of canned beverages.

The inlet section 202 is provided to receive fluid (e.g. carbonated water) entering into the nozzle 200. The inlet section defines an inlet channel with a first diameter. The inlet section 202 is coupled to a transition section 203 with a gradual tapering cross section to promote a smooth transition from the first diameter to a smaller diameter. The transition section 203 has a transition inlet 204, a transition outlet 206, and a transition body 208 that extends between the transition inlet 204 and the transition outlet 206 and defines a transition channel. The transition inlet 204 has a diameter equal to the first diameter and greater than a second diameter of the transition outlet 206. In other words, the second diameter of the transition outlet 206 is smaller than the first diameter. As such, the transition body 208 tapers longitudinally from the transition inlet 204 to the transition outlet 206. The transition section 203 has a frustoconical shape that provides a linear transition into the restriction region 212. In some implementations, the transition section 203 has a length of about 0.50 in. For the interest of clarity, the term "about" is used throughout the disclosure to mean a value of plus or minus 10% of the reference value. For example, about 0.50 in. means a length from 0.35 in. to 0.65 in. The first diameter is about 0.25 in. and the second diameter of the transition outlet 206 is about 0.08 in.

Although the transition section 203 has a frustoconical shape, in some implementations, the transition section 203 may have a frustro-pyramidal shape, or any other shape suitable to transition fluid flows through the transition body 208 from the first diameter to the second diameter. In the implementation shown in FIGS. 2-3, the first diameter is about 0.25 in., and the second diameter is about 0.08 in. But in other implementations the first diameter has any diameter from 0.125" to 0.375 in. and the second diameter has any diameter from 0.05 in. and 0.10 in.

The restriction region 212 defines a restriction channel. The restriction channel is a length of tube that has a third diameter smaller than the first diameter of the inlet channel. In various implementations, the third diameter of the restriction channel is equal to the second diameter of the transition outlet 206. The restriction region 212 provides backpressure to the system 100 to reduce carbonation breakout between the carbonator 10 and the nozzle 200. The restriction region 212 has a restriction inlet 214, and a restriction outlet 216, a restriction body 218 that extends between the restriction inlet 214 and a restriction outlet 216 and defines the restriction channel. The restriction region 212 has a uniform diameter. In some implementations, the restriction region 212 has an axial length of 1.25 in. and has a diameter of 0.08 in. The restriction inlet 214 is coupled to transition outlet 206, such that the transition channel and the restriction channel are fluidically coupled to each other and such that fluid passing through the inlet channel can pass into the restriction region 212.

Although the restriction region 212 has an axial length of 1.25 in. region 212 has any diameter from 0.05 in. to 0.10 in. or any other or any other diameter suitable to provide an effective backpressure in the system. Although the restriction region 212 has a uniform diameter, in some implementations, the third diameter of restriction channel is smaller than the second diameter of the transition outlet 206.

The expansion chamber 222 provides a smooth downstream transition to a channel that has a diameter that is greater than the diameter of the restriction region 212. The expansion chamber 222 promotes a gentle change in fluid flow characteristics as fluid approaches the straight tube outlet 248 of the nozzle 200 such that the transition does not induce additional breakout of carbon dioxide. The expansion chamber 222 is also shaped to discourage formation of low-pressure regions that unevenly isolate bubbles in sections of the expansion chamber 222. The expansion chamber 222 has an inlet 224, an outlet 226, and an expansion body 228 that extends between the inlet 224 and the outlet 226. The expansion chamber 222 has a trumpet shape with a maximum diameter at the outlet 226. A fourth diameter of the outlet 226 of the expansion chamber 222 is greater than the first diameter of the inlet channel.

The expansion body 228 includes a curved expansion section 230 and a linear expansion section 232 and defines an expansion chamber 222. The curved expansion section 230 includes a flared body that extends from inlet 224 of the expansion chamber 222 and increases in diameter to a maximum diameter of the curved expansion section 230 toward the outlet 226 of the expansion chamber 222. The curved section viewed through an axial cross section of the expansion chamber 222 forms an exponential curve on each side of and spaced apart from a central longitudinal axis of the expansion chamber 222.

The linear expansion section 232 extends linearly between the maximum diameter of the curved expansion section 230 and the outlet 226 of the expansion chamber 222. The linear expansion section 232 extends linearly outward from the central longitudinal axis of the expansion chamber 222. The outlet 226 diameter of the expansion chamber 222 is 12.5 times the inlet 224 diameter of the expansion chamber 222. The inlet 224 diameter is of the expansion chamber 222 is 0.08 in. and the outlet 226 diameter of the expansion chamber 222 is 1.0 in. The expansion chamber 222 has an axial length 0.13 times the outlet 226 diameter of the expansion chamber 222.

Although the outlet 226 diameter of the expansion chamber 222 is 12.5 times the inlet 224 diameter of the expansion chamber 222, in some implementations, the outlet 226 diameter of the expansion chamber 222 is any diameter from 10 to 20 times the inlet 224 diameter of the expansion chamber 222, or any other diameter suitable to promote gentle flow characteristics in fluid flowing therethrough. The inlet 224 diameter is of the expansion chamber 222 is 0.08 in. and the outlet 226 diameter of the expansion chamber 222 is 1.0 in., but in other implementations the inlet 224 diameter is any diameter from 0.05 in. to 0.10 in. or any other diameter suitable to promote gentle flow characteristics in fluid flowing through the expansion chamber 222. In some implementations, the outlet 226 diameter is any diameter from 0.80 in. to 1.6 in. or any other diameter suitable to promote gentle flow characteristics in fluid flowing through the expansion chamber 222. Although the expansion chamber 222 has an axial length 0.13 times the outlet 226 diameter of the expansion chamber 222, in some implementations the axial length is any length from 0.10 to 0.20 times the outlet diameter or any other length suitable to promote gentle flow characteristics in fluid flowing through the expansion chamber 222.

The diffuser plate 234 distributes fluid flowing through the nozzle 200 such that the fluid retains desired output flow characteristics. The diffuser plate 234 stabilizes the mesh insert 240—ensuring the mesh insert 240 is flat and even across an axial cross-section of the diffuser plate 234. The diffuser plate 234 also assists in aligning streamlines of fluid to advance development of fluid flow before fluid reaches the end of the straight tube outlet 248. The diffuser plate 234 includes central opening 238 and a plurality of circumferential outer openings 236. The central opening 238 is positioned at the outlet 226 of the expansion chamber 222. The central opening 238 of the diffuser plate 234 is fluidically coupled to the expansion chamber 222, and the outer openings 236 are fluidically coupled to other fluid sources that mix with the carbonated water.

The mesh insert 240 is provided to distribute bubbles across a cross-sectional area of the diffuser plate 234. With a multiphase flow such as that of carbonated liquid, the amount of local gas (known as void fraction) can create velocity gradients. By including the mesh insert 240 in a fluid flow path of the expansion chamber 222, fluid flow can be redistributed and even velocity can be established across the expansion chamber 222. The mesh insert 240 creates an even plane of openings through which a fluid mixture can pass through. Due to the nature of the gas within a carbonated fluid mixture, the mesh insert 240 prevents the gas from coalescing into large bubbles until further through the flow path of the fluid. The expansion chamber 222, coupled with the mesh insert 240, also prevents an abrupt change in fluid velocity. The expansion chamber 222 equalizes the distribution of fluid across the cross-section of the fluid flow path, which minimizes any localized pressure gradients within the fluid stream. As such, the expansion chamber 222 coupled with the mesh insert 240 helps redistribute flow evenly across the straight tube outlet 248.

The mesh insert 240 is a wire mesh that includes wires, which cross to form intersections which define square mesh openings. The mesh insert 240 includes 250,000 openings per square foot. The mesh insert 240 has a circular cross section and extends across a cross sectional area of the diffuser plate 234. The mesh insert 240 is positioned in the diffuser plate 234 such that a mesh intersection is positioned across a cross section of each of the plurality of openings 242 of the diffuser plate. The mesh insert 240 is formed from 316 Stainless Steel.

Although the mesh openings are square, in some implementations the mesh openings are rectangular, circular, or any other shape suitable to distribute bubbles across the mesh. Although the mesh insert 240 has 250,000 openings per square foot, in some implementations, the mesh insert 240 has any number of openings from 100, to 500,000 per square foot or any other number of openings suitable to distribute bubbles. Although the mesh insert 240 is formed from 316 Stainless Steel in some implementations, the mesh insert 240 is formed from Acrylonitrile Butadiene Styrene, Polyethylene Terephthalate Glycol, Teflon, or any other material suitable to distribute bubbles across the cross-sectional area of a diffuser plate 234 in a drink dispenser.

The straight tube outlet 248 provides a guide to channel fluid flowing out of the nozzle 200 into a desired container such as a cup or bottle. An outlet diameter of the straight tube outlet 248, which is larger than other portions of the nozzle 200, reduces outlet velocity of a carbonated liquid pumped via force from a constant pressure. This creates a reduction in shearing forces within the fluid stream of the carbonated liquid and results in a reduction of gas breaking out from the fluid mixture. The straight tube outlet 248 is a hollow cylindrical tube that has an inlet 250, an outlet 252, and a tube body 254 that extends between the inlet 250 and the outlet 252. The straight tube body 254 defines a straight tube channel. The straight tube channel has a uniform diameter that is equal to a maximum diameter of the expansion body 228. The straight tube outlet 248 has a length of 2 in. and a diameter of 1 in. The straight tube outlet 248 has an axial length 2 times the diameter of the straight tube channel 256. The first end of the straight tube outlet 248 is coupled to the outlet 226 of the expansion chamber 222, such that fluid flowing out of the expansion chamber 222 passes through the straight tube channel and out of the system.

Although the straight tube channel has a uniform diameter, in some implementations the straight tube channel has a non-uniform diameter. Although the straight tube has an axial length of 2.0 in. and a diameter of 1.0 in. in some implementations, the straight tube channel has any axial length from 0.50 in. to 3 in., any diameter from 0.25 in., to 1.5 in. or any other length and diameter suitable to guide fluid from the nozzle 200 into a desired container. Although the straight tube outlet 248 has an axial length that is 2 times diameter of the straight tube channel, in some implementations the axial length of the straight tube outlet 248 is any length from 0.50 to 3 times the diameter of the straight tube channel or any other length suitable to guide fluid from the nozzle 200 into a desired container. Although the nozzle 200 shown in FIG. 2 includes a straight tube channel 256, in other examples the nozzle 200 includes a bowl outlet, a cone, or any other outlet suitable to guide fluid from the nozzle 200 into a desired container.

In operation of the system, water and carbon dioxide are distributed into the carbonator. Carbon dioxide is dissolved into water supplied to the carbonator at a predetermined pressure. The pressure may be from 50 psi. to 120 psi., for example. The carbonator produces carbonated water with from 5 to 10 volumes of carbon dioxide dissolved therein. Therefore, the carbonated water is a supersaturated with carbon dioxide and carbon dioxide is readily released (e.g. breakout) from the carbonated water in the form of bubbles.

The carbonated water is pumped into the inlet of the nozzle 200 and passes through the inlet channel. The carbonated water is pumped through the outlet opening 206 of the inlet channel and into the restriction region 212. The restriction channel 220 has a smaller diameter than the inlet channel 210 as described above and produces backpressure in the restriction channel. As described above, the backpressure reduces carbonation breakout in the carbonated fluid in the inlet section 202 and the carbonator. The carbonated water is pumped from the restriction channel through the expansion chamber, which causes the carbonated water to flow through a wider cross-section that transitions to diameter desired for an outlet. The carbonated water is pumped through expansion chamber 222 through the diffuser plate 234. As the water passes through the diffuser plate 234, the carbonated water passes across the mesh insert 240, which separates bubbles in the carbonated water and disburses them across the cross section of the diffuser plate 234. The carbonated water flows into the straight tube outlet 248 and exits the system. Although carbonated water exits the system in the system described in FIG. 1, in some implementations, additional additives, such as sweetener or flavoring are added to the carbonated water as it passes through the system 100 or upon being dispensed therefrom causing the system 100 to output flavored and/or sweetened carbonated liquids.

While several implementations have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A fluid dispensing nozzle, comprising:

an inlet section which defines an inlet channel with a first diameter;

a restriction region which defines a restriction channel fluidically coupled to the inlet channel, the restriction channel extending along a first predetermined length and having a second diameter that is smaller than the first diameter;

an expansion chamber which defines an expansion channel fluidically coupled to the restriction channel, the expansion chamber having a trumpet shape with a maximum diameter at an outlet of the expansion chamber, wherein the maximum diameter of the expansion chamber is greater than the first diameter; and a diffuser plate positioned at the outlet of the expansion chamber, the diffuser plate comprising a plurality of openings and a mesh insert that is disposed across the plurality of openings.

2. The nozzle of claim 1, wherein the trumpet shape of the expansion chamber comprises a curved expansion section comprising a flared body that extends from the second diameter of the restriction channel and increases in diameter toward the expansion chamber outlet.

3. The nozzle of claim 2, wherein the flared body as viewed through an axial cross section of the expansion chamber forms an exponential curve on each side of and spaced apart from a central longitudinal axis of the expansion chamber.

4. The nozzle of claim 2, wherein the trumpet shape of the expansion chamber further comprises a linear expansion section extending between a maximum diameter of the curved expansion section and the maximum diameter at the outlet of the expansion chamber.

5. The nozzle of claim 1, wherein the outlet diameter of the expansion chamber is from 10 to 20 times an inlet diameter of the expansion chamber.

6. The nozzle of claim 1, wherein the expansion chamber has an axial length from 0.10 to 0.20 times the maximum diameter at the outlet of the expansion chamber.

7. The nozzle of claim 1, wherein the mesh insert has from 100 to 500,000 mesh openings per square foot.

8. The nozzle of claim 1, wherein the mesh insert includes a plurality of mesh intersections, wherein at least one of the mesh intersections is positioned across a cross section of each of the plurality of openings of the diffuser plate.

9. The nozzle of claim 1, wherein the second diameter of the restriction region is from 10 to 20 times smaller than the first diameter of the inlet section.

10. The nozzle of claim 1, wherein the restriction region has an axial length greater than the second diameter of the restriction region.

11. The nozzle of claim 1, further comprising a straight tube outlet that defines a straight tube channel.

12. The nozzle of claim 11, wherein the straight tube outlet has a length from 0.25 inches to 1.5 inches.

13. The nozzle of claim 11, wherein the straight tube channel has a uniform diameter that is equal to a maximum diameter of the expansion body.

14. The nozzle of claim 11, wherein the straight tube outlet has an axial length from 0.50 to 3.0 times the diameter of the straight tube channel.

15. A beverage dispensing system, the system comprising:

a nozzle;

a carbonator with a water inlet, a carbon dioxide inlet, and a carbonated water outlet; and a carbonated water line extending between the carbonated water outlet and the nozzle, wherein the nozzle comprises:

an inlet section which defines an inlet channel with a first diameter;

a restriction region which defines a restriction channel fluidically coupled to the inlet channel, the restriction channel extending along a first predetermined length and having a second diameter that is smaller than the first diameter;

an expansion chamber which defines an expansion channel fluidically coupled to the restriction channel, the expansion chamber having a trumpet shape with a maximum diameter at an outlet of the expansion chamber, wherein the maximum diameter of the expansion chamber is greater than the first diameter; and a diffuser plate positioned at the outlet of the expansion chamber, the diffuser plate comprising a plurality of openings and a mesh insert that is disposed across the plurality of openings.

16. The nozzle of claim 15, wherein the carbonator water outlet is fluidically coupled to the restriction channel to provide carbonated water through the expansion channel.

17. The nozzle of claim 15, wherein the restriction channel is configured to provide a backpressure from the nozzle to the carbonator.

18. The nozzle of claim 15, wherein the carbonator is configured to supply carbonated water to the carbonated water outlet at a first pressure and exit the system at a second pressure, and wherein the expansion chamber is configured to mitigate turbulence of carbonated water exiting the system.

19. The nozzle of claim 18, wherein the expansion chamber is configured to promote a uniform fluid velocity across a cross section of the expansion channel.

20. The nozzle of claim 15, wherein the nozzle further comprises a straight tube outlet that defines a straight tube channel.

* * * * *